April 11, 1972

S. A. FRANCIS

Re. 27,335

AQUATIC PROBE

Original Filed Aug. 13, 1964

INVENTOR
SAMUEL A. FRANCIS

BY
Wolte & Wolte
ATTORNEYS

United States Patent Office

Re. 27,335
Reissued Apr. 11, 1972

27,335
AQUATIC PROBE

Samuel A. Francis, Marion, Mass., assignor to The Buzzards Corporation, Marion, Mass.

Original No. 3,349,613, dated Oct. 31, 1967, Ser. No. 389,434, Aug. 13, 1964. Application for reissue Aug. 15, 1969, Ser. No. 862,986
Int. Cl. G01c *13/00*
U.S. Cl. 73—170 A 16 Claims

Matter enclosed in heavy brackets [ ] appears in the original patent but forms no part of this reissue specification; matter printed in italics indicates the additions made by reissue.

ABSTRACT OF THE DISCLOSURE

The present invention includes apparatus to be deployed from an underwater vessel, comprising a bathythermograph probe having a quantity of wire wound therein and having a negative buoyancy, a thermistor contained within the probe, a float assembly releasably secured to the probe and initially having a positive buoyancy and having an internal chamber.

Figure 3:
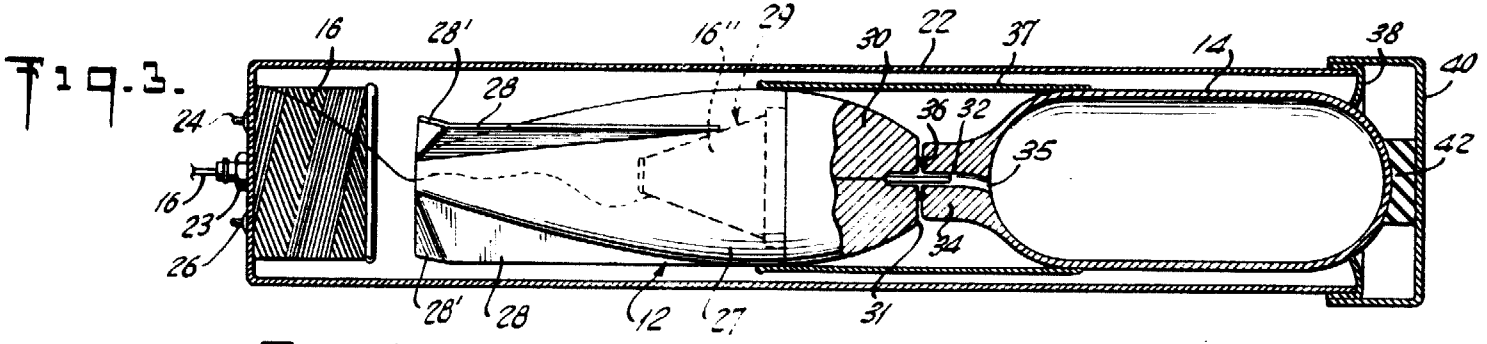

This invention relates to a method and apparatus for deploying a measuring or sensing probe from an underwater vessel such as a submarine.

In U.S. Patent No. 3,221,556 to Campbell et al., there is disclosed apparatus for measuring properties of water such as temperature, salinity, etc. as a function of depth. The inventions of that application, though not limited, are designed primarily for use with surface going vessels from which an expendable probe is deployed into the water. In accordance with that application, the probe includes a sensing device, such as a thermistor, which is connected to a coil of wire within the probe, the coil unwinding as the probe descends vertically through the water. The probe coil is connected to a second spool of wire located on board ship and deployed horizontally as the boat travels across the water. The sea water may be used as an electrical return path, and, for special purposes explained in that application, one or two wires may be deployed from the sensor probe and launching vehicle. This unique manner of deploying a transmission line provides many significant advantages including improved accuracy and a notable increase in the speed at which the measurements can be taken.

There are also situations wherein it is desirable to make the necessary measurements without the use of surface vessels. If secrecy is desired, the most obvious launching vehicle is a submarine, and it is contemplated that the probe of U.S. Patent No. 3,221,556 to Campbell et al. be used in conjunction with a buoyant member and launched from beneath the surface of the water. However, in the interests of secrecy, the probe must not break the surface of the water nor emit telltale signs such as air bubbles and the like. For these reasons, the obvious techniques for converting the above described probe and other conventional devices to underwater use have been found generally unsatisfactory.

In a related sense, it is also desirable to deploy acoustical sensing devices, active or passive from a submarine with minimum exposure of the submarine to enemy detection devices. Conventionally, if a submarine wishes to know what is above and below it the submarine must traverse the depths from which it desires information, thus materially increasing the possibility of its detection.

Accordingly, the main object of the present invention is to provide a probe adapted to be released from an underwater vessel, which probe will not materially expose such vessel to detection.

Another object of the invention is to provide an expendable probe, for release underwater, which will not break the surface of the water.

Another object of the invention is to provide a probe of the type described which will not emit telltale signs of its presence such as air bubbles.

Still another object of the invention is to provide an expendable oceanographic or acoustical probe, adapted to be released under water from a submarine or the like, and incorporating all of the above advantages together with the specific benefits provided by the type of probe illustrated in U.S. Patent No. 3,221,556.

In the following specification, the invention is described for use an an oceanographic probe.

However, the invention would also have particular utility as an acoustical sensing ordnance, decoy device, etc.; therefore in the specification and claims, the phrase "aquatic probe" is intended to include all of these embodiments and any related device which it may be desired to deploy from an underwater vessel such as a submarine. "Information retrieving means" includes property sensing devices such as thermistors, as well as acoustical devices, and the invention is not to be construed as limited to any specific type of information retrieved.

In accordance with the invention, the above objects are accomplished by securing an aquatic probe to an evacuated float which holds the probe by suction, the junction of the probe and vacuum float being so dimensioned that when the two have reached a predetermined depth, the pressure of the water becomes insufficient to hold the two together and the probe is released. Thus, as the probe and the float rise, the pressure differential between the vacuum and the outside hydrostatic pressure decreases to such an extent that the weight of the probe overcomes the suction force holding the probe to the float and the probe then falls away from the float. When the probe is thus released, it falls through the water under the influence of gravity, during which time the desired information is obtained and transmitted back to the launching vessel or submarine. Since the probe does not reach the surface of the water, there is no possibility of it breaking the surface to indicate the presence of the submarine. Also, due to the vacuum within the float, when the junction is broken, the surrounding water rushes into the float to fill the vacuum and there is no possibility of air bubbles being emitted to indicate the presence of the submarine. After the desired measurements have been made, the probe, which is designed to be expendable, may be cut loose and permitted to fall with the discarded float to the floor of the ocean.

Figure 2:
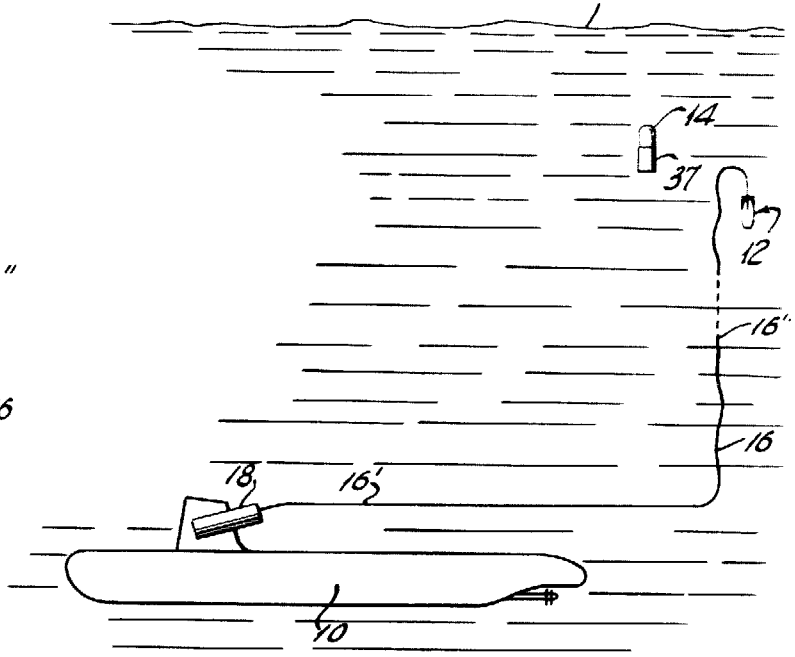
Figure 1:
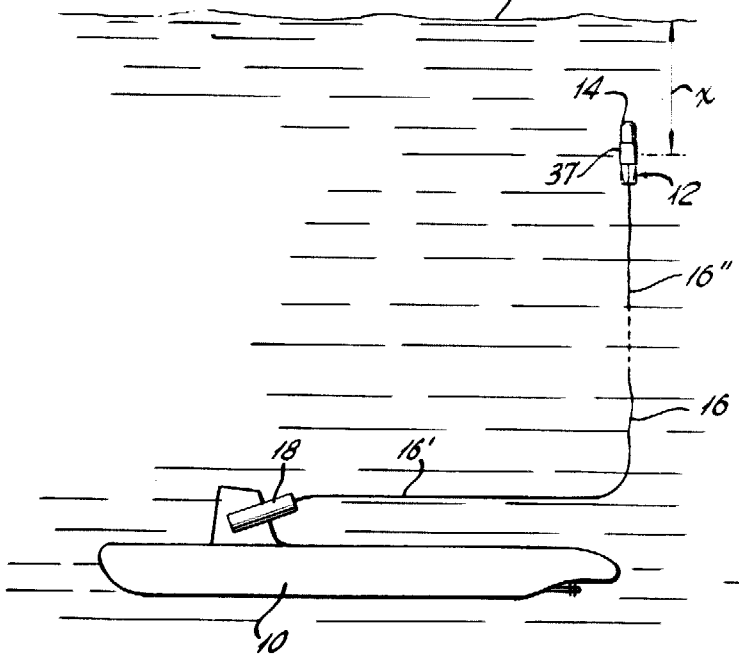

The manner in which the above objects are accomplished is more fully described below with reference to the following drawings wherein:

FIGURES 1 and 2 are schematic diagrams showing the operation of the invention; and FIGURE 3 is an illustration partially in cross section, showing the probe and vacuum float stored within a canister prior to release.

In FIGURE 1 a submarine indicated generally at 10 has released the sensing probe 12 which is secured to a bottle-shaped vacuum float 14 in a manner described below. A property sensing device within probe 12 is connected to recording apparatus within the submarine via wire 16. The probe 12 and vacuum float 14 are deployed from a launching tube 18 and the sensing apparatus has floated to a distance x from the surface 20 of the ocean. The wire 16 may be considered to comprise a horizontal portion 16' and a vertical portion 16'', which are simultaneously deployed from submarine 10 and probe 12, respectively. Launching tube 18 may be of the type normally employed to release signal flares and the like As explained more fully below, the probe 12 and vacuum float 14 are themselves contained in a vacuum environment within a canister 22 prior to deployment. Consequently, when these two members are permitted to float upwardly, the water rushes in to fill the vacuum within canister 22 and there is no possibility of forming air bubbles. When the vacuum float 14 and probe 12 reach the illustrated position, the water pressure is insufficient to hold the two together and they fall apart as shown in FIGURE 2. At this point the buoyant force is removed from 12, and the sensing device is exposed to the water initiating the desired measurements. These measurements continue as the probe falls through the water under the influence of gravity, and are transmitted back to the submarine recording equipment via wire 16 and the sea return path so that the property may be recorded as a function of depth. Float 14 is filled with water without the formation of air bubbles due to its vacuum and permitted to fall to the ocean floor.

FIGURE 3 illustrates a preferred embodiment of the combined probe and vacuum float employed in FIGURES 1 and 2. The probe and float are normally stored within evacuated canister 22 including an external nut 23 through which wire 16 extends for connection to the submarine recorder apparatus. The probe 12 includes a ballistically shaped fuselage 27 having three offset stabilizing fins 28, including bent portions 28' to impart a slight rotational movement to the probe during its descent through the water. The fuselage fits into a solid head portion 30 having a spool 31 around which wire portion 16'' is conically wound.

The forward portion of the probe includes a blunted head 30 having a flat forward face 31, from which a combined thermistor and sea return electrode 32 extends. The vacuum float 14 may be made of glass and includes a thick neck 34 through which passes an off-set nozzle 35. Probe 12 and vacuum float 14 are placed together so that the combined thermistor and sea return electrode 32 extends for a short distance into the nozzle 35. An O-ring 36, made of rubber or the like, insures a water tight seal between the probe 12 and vacuum float 14. A cylindrical support member 37 may be used as a support member to lessen the chances of probe 12 and float 14 accidentally parting.

The interior area within O-ring 36 determines the effective "area of contact" between the vacuum float and probe; therefore it is a critical parameter in determining the pressure or depth at which the float 14 and probe 12 will part to initiate the measuring cycle. Hence, O-ring 36 provides an additional advantage, since various rings would be readily interchangeable to enable the user to vary the depth at which the initial measurements are to be made.

The open end of the canister 22 is sealed initially by an electrically conductive seal member 38, which engages the open end of canister 22 and the base portion of float 14. Seal 38 must be capable of withstanding the pressure effects when the launching tube 18 is pressurized prior to launching. The seal 38 operates in the manner of a fuse when a predetermined volage is applied thereto to melt and release the probe prior to launching. By way of example only, seal 38 may be made of a readily meltable plastic material in which hot wires are embedded. When a current is passed through the wires, the generated heat melts the plastic to release the probe 12 and float 14. For shipping purposes, the canister is closed by a cap 40 having a central rubber bumper 42 engaging float 14.

The operation of the device is as follows: The cap 40 is removed from the canister 22, and the canister inserted within launching tube 18 with contactors 24 and 26 engaging mating electrical terminals aboard ship to enable transmission of the data to the submarine. It is recalled that both the canister 22 and the float 14 are evacuated. When the canister is opened by removal of cap 40 atmospheric pressure is applied to membrane 38, which holds the pieces together in lieu of the rubber bumper. The canister is then breech-loaded into the launching tube 18, the breech closed and sealed, and the launcher filled with sea water, possibly pumping out the air which was trapped in it. While the launcher is still under a pressure slightly above atmospheric and not yet filled with sea water, seal 38 is burned off. The seal 38 may be broken by applying a sufficient voltage thereto in any suitable manner. For example, the seal 38 may be placed in the launching tube in such a manner that the wires within the seal contact corresponding electrodes on the interior surface of the tube through which the voltage is applied.

When seal 38 is broken, the water rushes into tube 18 filling the vacuum within canister 22 and applying relatively great external pressure to the probe and float 14. Due to this increased pressure and the vacuum within float 14, probe 12 is tightly pushed against the float with a suction effect. Once the cap is removed there is no restraining force on the probe 12 and float 14, and since the float is of sufficient size whereby the weight of the water displaced by the probe and float is greater than their combined weight, the two members float upwardly through the water. As the device moves through the water, wire 16'' is deployed from the conical winding within fuselage 27 of probe 12, while simultaneously the coil wire 16' within canister 22, is uncoiled in a horizontal direction from the submarine 10.

Probe 12 and vacuum float 14 continue to rise, the pair being held together by suction due to the vacuum within float 14. However, when the device reaches a predetermined depth as explained more fully hereinbelow, the force exerted by the weight of the probe in a downward direction becomes greater than the force created by the water pressure differential (which is determined by the pressure exerted by the water and the area upon which that pressure acts), and the probe 12 falls free of the float 14. At this point the thermistor and sea return electrode 32 contact the water and return a signal to the recorder within submarine 10 to cause the recording operation to commence. The probe then continues to fall at a predetermined rate of speed and the returning signals from this thermistor are recorded within submarine 10 as a function of depth, the chart recorder being moved at a rate related to the descent of the probe. The float 14 immediately fills with water and because the float material itself is more dense than water, it falls to the floor of the ocean. The specific means for recording the measured data, and the circuitry for returning such data to the recording station are not part of the present invention and preferred embodiments thereof are fully described in U.S. Patent No. 3,221,556. *For example, as shown in this patent, the sea return electrode, upon contacting the water, effects the connection of one end of the thermistor to the recorder by way of a sea return path, the other end of the thermistor being connected to the recorder in the submarine by way of the wire 16.*

When the probe 12 breaks away from the vacuum float 14, the water enters the float through the nozzle 35. Due to the relatively small diameter of this nozzle and the proximity of the float to the surface of the water, there is considerable danger that the water will not fill the interior of the float quickly enough to prevent the float from breaking the surface of the water. For this reason, nozzle 35 is off-set to produce an asymmetric reaction due to the entering jet of water which will apply a moment about the float's center of gravity. This produces a tumbling effect on the float after the probe is released to slow the ascent of the vacuum float sufficiently to prevent surfacing.

The probe 12 is designed to descend at a sufficient rate to establish turbulent flow especially because of the blunt head. As a result, the drag coefficient will remain constant with changes in Reynold's number, and changes in viscosity due to temperature will not affect velocity and the resulting depth accuracy of the recorder.

As mentioned above, the point at which probe 12 and float 14 part is determined by the downward force on the probe weight plus hydrodynamic drag and the uniting force exerted by the pressure of the water. The latter force is equal to the product of the water pressure and the area on which that pressure is applied. In this particular case, that area is determined by the diameter of the nozzle 35 of float 14. By way of example only, and assuming a total downward force on the probe of 1.25 pounds, the probe 12 and float 14 will part at a depth of 20 feet from the surface of the water (i.e. at a pressure of 24.7 pounds per square inch) if the diameter of the interior portion of neck 36 is approximately 0.254 inch.

Although a preferred embodiment of the invention has been shown and described in detail, to illustrate the application of the invention principles, it will be understood that the invention may be embodied otherwise without departing from such principles.

What I claim is:

1. In apparatus for being deployed from an object submerged in a liquid, a probe assembly [having wound therein a length of wire], said proble assembly having a negative buoyancy, means for sensing information secured to said probe assembly, a float assembly [releasably secured to said probe assembly by a suction force prior to deployment], said float assembly initially having a positive buoyancy and including a housing defining an internal chamber, said housing having an opening formed therein and communicating with said chamber, said probe assembly and float assembly being in contact over a predetermined area therebetween *surrounding said opening, whereby said float assembly is releasably secured to said probe assembly by a suction force due to pressure in said chamber prior to depolyment of said apparatus from said object,* such that upon ascending after deployment said probe and float assemblies will separate at a predetermined hydrostatic pressure, the weight of the probe assembly overcoming the suction force holding the probe assembly to the float assembly such that the probe and float assemblies separate.

2. Apparatus according to claim 1, wherein said chamber is initially evacuated.

3. Apparatus according to claim 1, wherein said sensing means extends externally from said probe assembly and into said float assembly to prevent said sensing means from contacting liquid until said predetermined pressure is reached.

4. Apparatus according to claim 1, wherein said sensing means is connected to [said] *a* wire wound within said probe assembly.

5. Apparatus according to claim 1, including a canister initially containing said probe and float assemblies, said canister being closed by an electrically conductive, meltable seal.

6. Apparatus according to claim 1, including a sealing ring defining said predetermined area.

7. Apparatus according to claim 1, wherein said float assembly includes an offset nozzle communicating with said opening.

8. Apparatus according to claim 1, further comprising a canister assembly for initially containing said probe and float assemblies, and including connector means for electrically connecting said canister assembly to remote measuring apparatus.

9. Apparatus according to claim 8, further comprising meltable sealing means initially in contact with said canister assembly.

10. Apparatus according to claim 1, wherein the magnitude of said predetermined hydrostatic pressure is a function of the magnitude of said predetermined area.

11. Apparatus according to claim 1, wherein said sensing means is a thermistor.

12. Apparatus according to claim 1, wherein said sensing means is a sea return electrode.

13. Apparatus according to claim 1, wherein said sensing means is a combination thermistor and sea return electrode.

14. In a system for measuring a property of a liquid including apparatus adapted to be deployed from an object submerged in said liquid, a probe assembly [having wound therein a length of wire], said probe assembly having a negative buoyancy and including means for sensing information, a float assembly [releasably secured to said probe assembly by a suction force prior to deployment], said float assembly initially having a positive buoyancy and including a housing defining an internal chamber, said housing having an opening formed therein and communicating with said chamber, said probe and float assemblies being in contact over a predetermined area therebetween *surrounding said opening, whereby said float assembly is releasably secured to said probe assembly by a suction force due to pressure in said chamber prior to deployment of said apparatus from said object,* such that upon ascending after deployment said probe and float assemblies will separate at a predetermined hydrostatic pressure, the weight of the probe assembly overcoming the suction force holding the probe assembly to the float assembly such that the probe and float assemblies separate.

15. Apparatus for being deployed from an underwater vehicle, comprising an aquatic probe assembly having wound therein a first length of wire, said probe assembly having a negative buoyancy and including means for sensing information, said first length of wire electrically connected to said sensing means, a float assembly releasably secured to said probe assembly by a suction force prior to deployment, and including a housing defining an internal chamber, a neck portion integral with said housing and defining a passage communicative with said chamber, said passage further defining a nozzle within said neck portion, said neck portion having a bearing surface, means for sealing, comprising a sealing ring initially compressed between said probe assembly and said bearing surface for providing a fluid-tight seal therebetween, an interior predetermined area within said sealing ring defining a contact area between said probe and float assemblies, and a canister assembly for initially containing portions of said probe and float assemblies, comprising an elongated container having an open end and a closed end, a second length of wire in wound configuration within said container adjacent said closed end and continuous with said first length of wire, electrical contact means connected to said second length of wire for electrically connecting said canister assembly to remote measuring apparatus, a sealing cap initially covering and sealing said open end, comprising a meltable seal member having embedded therein at least one conductor, said seal member initially engaging a portion of said float assembly and said open end and forming a pressure tight seal, a portion of said seal member melting upon current passing through said conductor and thereby releasing said probe and float assemblies from said container, said first and second lengths of wire wound for being freely payed out from said probe and canister assemblies respectively, said probe and float assemblies ascending after release thereof and thereafter separating at a predetermined hydrostatic pressure upon the weight of the probe assembly overcoming the suction force such that the probe and float assemblies separate from each other.

*16. In an apparatus for being released from an object submerged in a liquid, a first member having a hollow portion communicating with an external surface thereof, a second member adapted to contact said surface to form a seal between said first and second member, said hollow portion being of sufficient size that said apparatus has a positive buoyance when submerged in said liquid with said first and second members in contacting relationship and said members have negative buoyance when sepa-*

*rated, whereby said apparatus ascends upon release from said object, said hollow portion having a predetermined pressure whereby said first and second members are held together by a suction force at the depth of said object in said liquid, and separate from each other at a predetermined lesser depth in said liquid to permit said liquid to enter said hollow portion and overcome said positive buoyance, and information sensing means secured to said apparatus at least when said members are in contacting relationship, whereby said first and second members descend in said liquid upon separation of said first and second members.*

References Cited

The following references, cited by the Examiner, are of record in the patented filed of this patent or the original patent.

UNITED STATES PATENTS

| | | | |
|---|---|---|---|
| 2,422,337 | 6/1947 | Chilowsky | 340—2 |
| 2,447,069 | 8/1948 | Holcomb | 9—8 X |
| 2,465,993 | 4/1949 | Beechlyn | 340—2 X |
| 3,034,471 | 5/1962 | Aschinger | 114—235 |
| 3,077,113 | 2/1963 | Mattingly | 73—421.5 XR |
| 3,221,556 | 12/1964 | Campbell et al. | 73—362 |
| 3,119,090 | 1/1964 | Springer | 73—170 |

CHARLES A. RUEHL, Primary Examiner

U.S. Cl. X.R.

73—344